(12) United States Patent
Park

(10) Patent No.: US 12,458,384 B2
(45) Date of Patent: Nov. 4, 2025

(54) LAPAROSCOPIC SURGERY INSTRUMENT NOT REQUIRING TROCAR

(71) Applicant: KOREA UNIVERSITY RESEARCH AND BUSINESS FOUNDATION, Seoul (KR)

(72) Inventor: Sungsoo Park, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 463 days.

(21) Appl. No.: 17/925,321

(22) PCT Filed: Jul. 14, 2021

(86) PCT No.: PCT/KR2021/009019
§ 371 (c)(1),
(2) Date: Nov. 15, 2022

(87) PCT Pub. No.: WO2022/015041
PCT Pub. Date: Jan. 20, 2022

(65) Prior Publication Data
US 2023/0190318 A1    Jun. 22, 2023

(30) Foreign Application Priority Data

Jul. 14, 2020 (KR) .................. 10-2020-0087021
May 31, 2021 (KR) .................. 10-2021-0069961

(51) Int. Cl.
*A61B 17/29* (2006.01)
*A61B 17/00* (2006.01)

(52) U.S. Cl.
CPC ...... *A61B 17/2909* (2013.01); *A61B 2017/00681* (2013.01)

(58) Field of Classification Search
CPC ...... A61B 17/2909; A61B 2017/00681; A61B 2017/00283; A61B 2017/00473;
(Continued)

(56) References Cited

U.S. PATENT DOCUMENTS

2008/0243106 A1* 10/2008 Coe .................. A61B 17/00234
606/1
2010/0113872 A1  5/2010 Asada et al.
(Continued)

FOREIGN PATENT DOCUMENTS

CA      2897982 A1 *  7/2014  ............. A61B 17/29
JP      2009-072368 A    4/2009
(Continued)

OTHER PUBLICATIONS

International Search Report for PCT/KR2021/009019 mailed Nov. 10, 2021 from Korean Intellectual Property Office.
(Continued)

*Primary Examiner* — Shaun L David
*Assistant Examiner* — Rachael L Geiger
(74) *Attorney, Agent, or Firm* — Revolution IP, PLLC

(57) ABSTRACT

The present invention relates to a laparoscopic surgery instrument that does not require a trocar, the laparoscopic surgery instrument including: a first part inserted into the body of the abdominal cavity and provided with a surgical instrument; and a second part placed outside the body of the abdominal cavity and coupled to the first part to manipulate the operation state of the surgical instrument, wherein the first part and the second part are primarily coupled to each other by magnetic force while the first part is inserted into the body.

5 Claims, 6 Drawing Sheets

(58) Field of Classification Search
CPC .. A61B 2017/00477; A61B 2017/2902; A61B 2017/2931; A61B 17/29; A61B 2017/00876; A61B 2017/00637; A61B 2017/047

See application file for complete search history.

(56) References Cited

U.S. PATENT DOCUMENTS

| | | | |
|---|---|---|---|
| 2010/0217245 A1* | 8/2010 | Prescott | A61B 17/32002 606/1 |
| 2012/0083826 A1 | 4/2012 | Chao et al. | |
| 2013/0190572 A1 | 7/2013 | Lee | |

FOREIGN PATENT DOCUMENTS

| | | |
|---|---|---|
| JP | 2010-220876 A | 10/2010 |
| KR | 10-1039102 B1 | 6/2011 |
| KR | 10-1082762 B1 | 11/2011 |
| KR | 10-2012-0007522 A | 1/2012 |
| KR | 10-1330256 B1 | 11/2013 |
| KR | 10-1716520 B1 | 3/2017 |
| KR | 10-2018-0058923 A | 6/2018 |
| KR | 10-2021-0121665 A | 10/2021 |
| WO | WO-2010114634 A1 * | 10/2010 ....... A61B 17/00234 |

OTHER PUBLICATIONS

Office Action of Korean Patent Application No. 10-2021-0069961 mailed Jun. 13, 2023.

* cited by examiner

[FIG. 1]
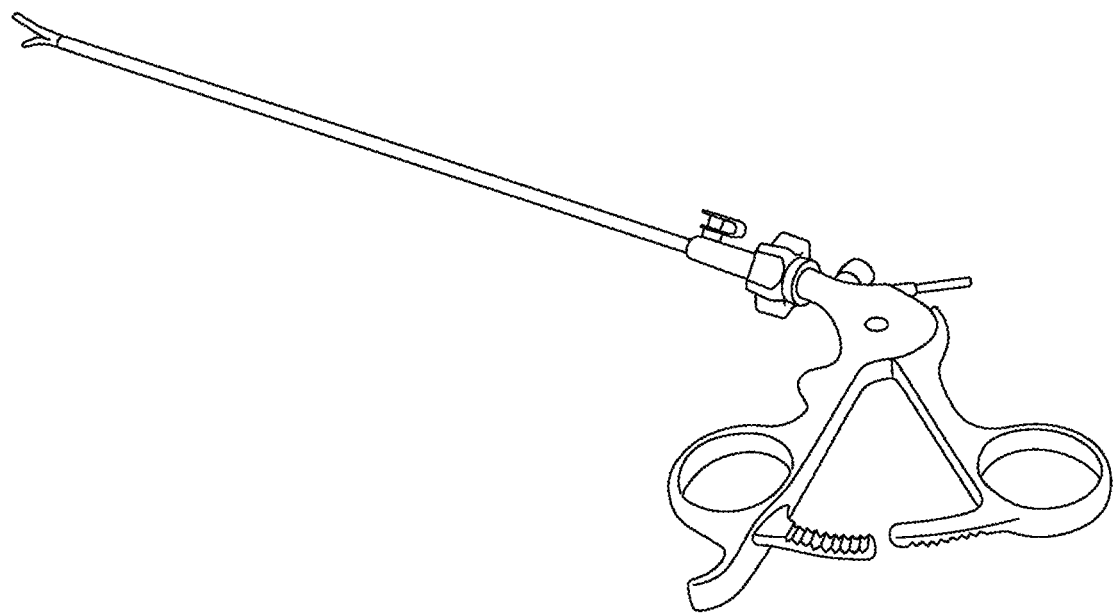
[FIG. 2]
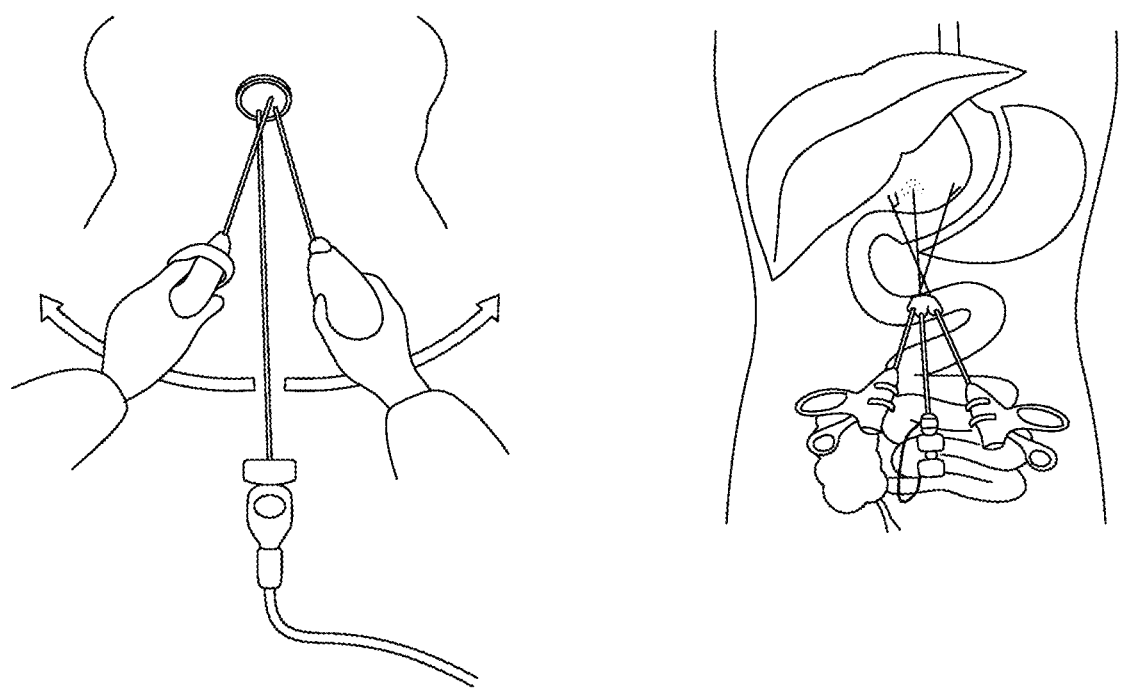

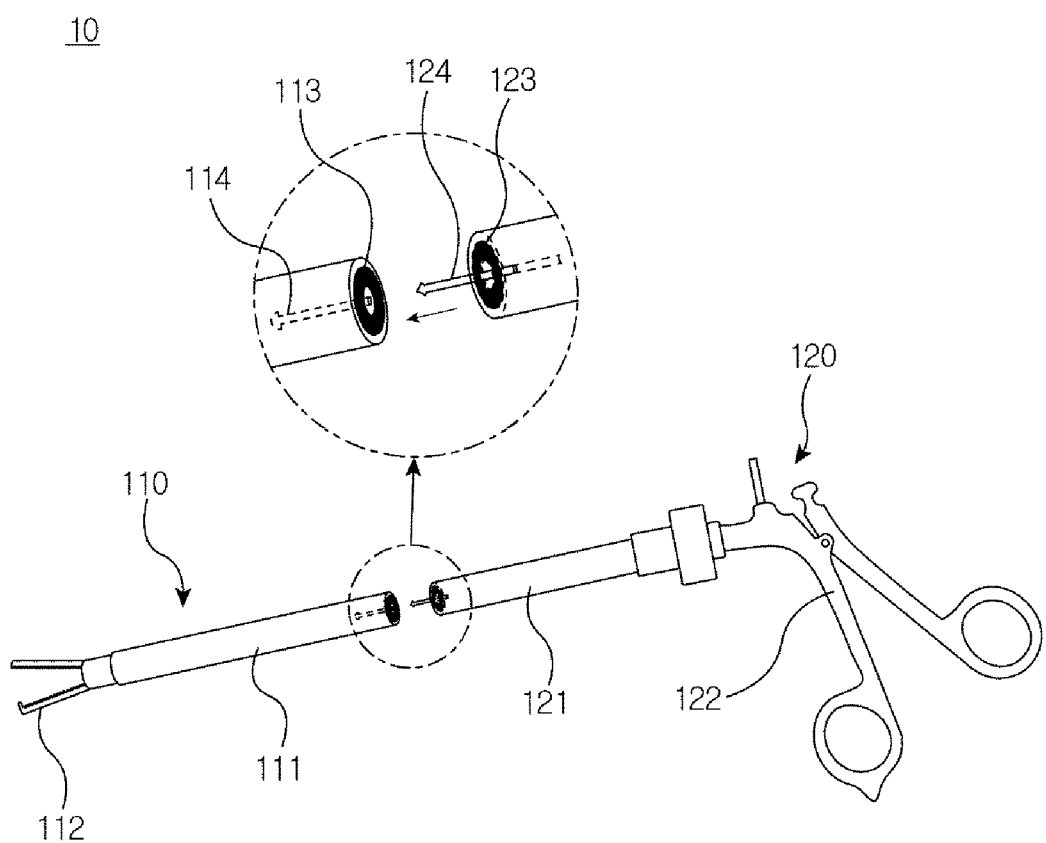
[FIG. 3]

[FIG. 4]
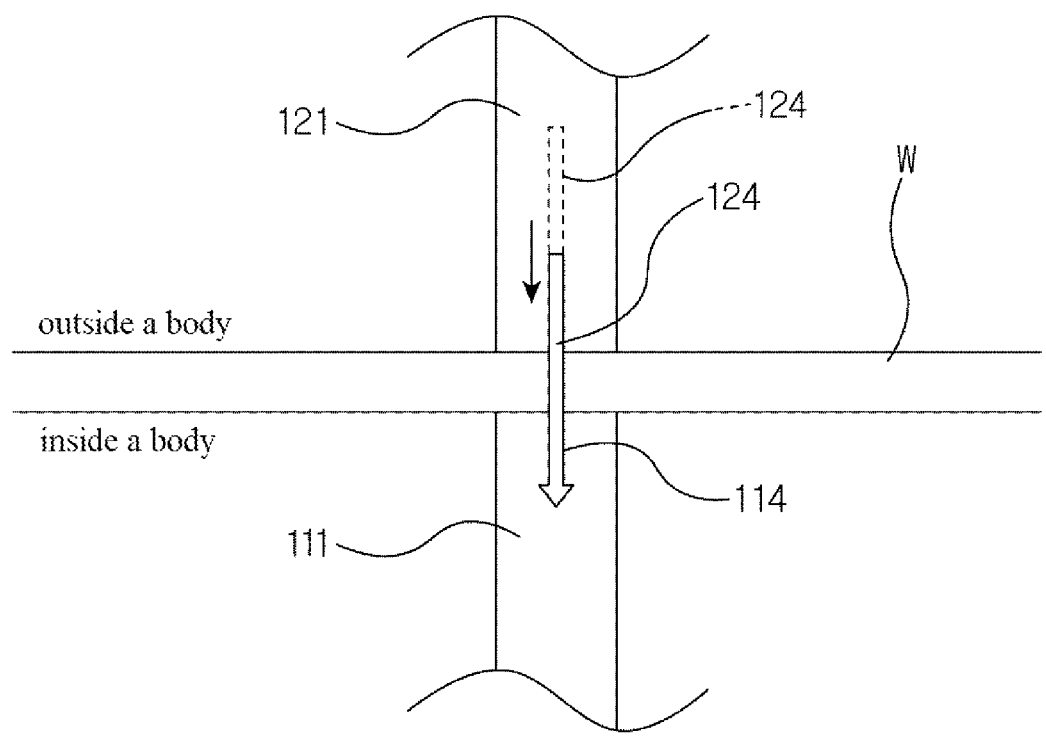

[FIG. 5]
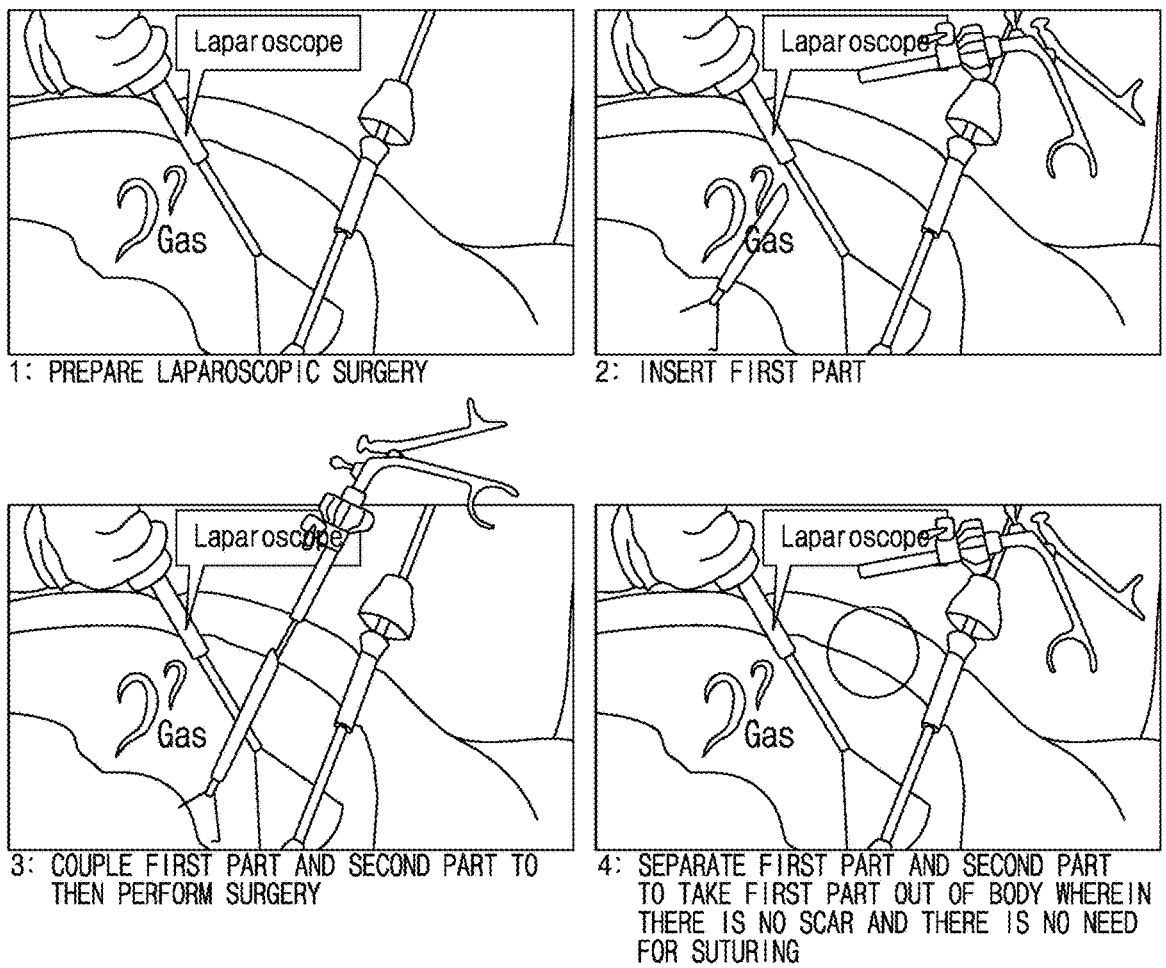

[FIG. 6]
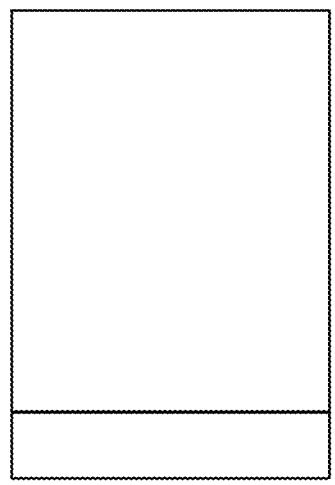
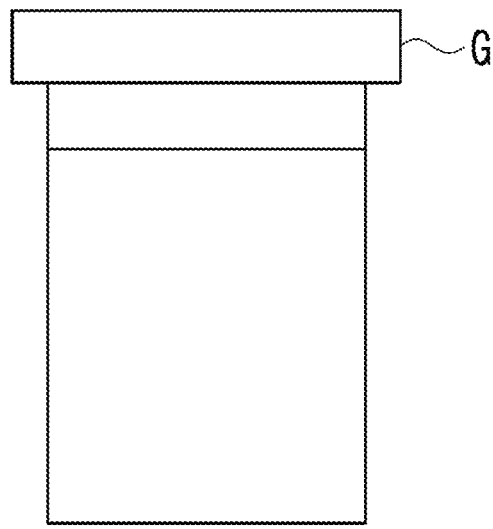

[FIG. 7]
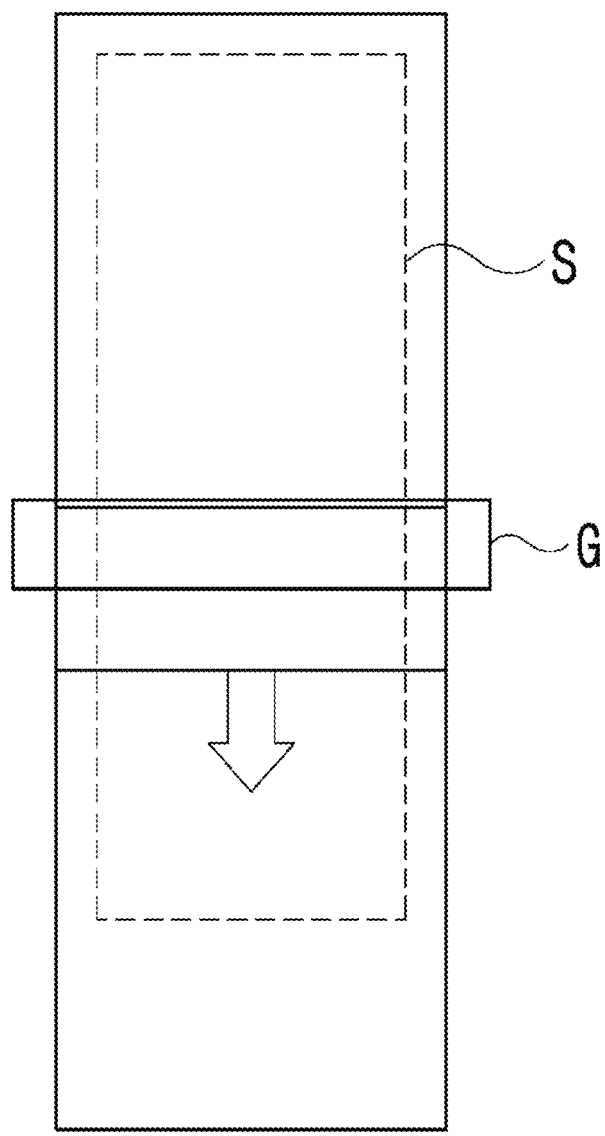

LAPAROSCOPIC SURGERY INSTRUMENT NOT REQUIRING TROCAR

TECHNICAL FIELD

The present invention relates to a laparoscopic surgical instrument that does not require a trocar, and more particularly, to a laparoscopic surgical instrument that does not require a trocar (has a trocar function), in which the laparoscopic surgical instrument includes a surgical instrument inserted into an abdominal cavity and operated, and an operation unit capable of operating an operating state of the surgical instrument by being coupled to the surgical instrument outside a body, thereby performing laparoscopic surgery without making a wound that leaves a scar on an abdominal wall.

BACKGROUND ART

Laparoscopic surgery is performs in such a manner that a carbon dioxide gas is injected into an abdominal cavity to generate a space in the abdominal cavity and to secure a surgery space and a view, a small hole is formed in an abdominal wall to insert an instrument called a trocar, and then a camera and a surgical instrument are inserted into a patient's body through the trocar to observe an image displayed on a monitor by the camera and to perform surgery.

At least three surgical instruments are required for laparoscopic surgery. Specifically, the laparoscopic surgery requires a camera (laparoscope), which is an essential component for observing the inside of an abdominal cavity during surgery, forceps (a type of laparoscopic instrument) for holding tissue, and a device (surgical energy device) such as a cutter or an ultrasonic generator for cutting tissue or performing an operation for treatment.

In the related art, a multi-port method, in which a plurality of holes are drilled in an abdomen to correspond to the number of surgical instruments to be used at the same time, one trocar is installed in each hole, and through each trocar, a surgical instrument is individually introduced into an abdominal cavity to perform surgery, has been mainly used. The multi-port method can significantly reduce surgical scars as compared with general laparotomy but still leaves several scars.

Meanwhile, in order to minimize scars that may occur after surgery, as shown in FIG. 2, a single port laparoscopy method, in which one incision (three times larger than an incision in laparoscopic surgery) is drilled in an abdomen to install a device (port) capable of inserting a plurality of trocars, and by using the installed device (port), a plurality of surgical instruments are inserted into an abdominal cavity through one incision to perform surgery, has been recently spread. In this case, the installed device should be provided with a plurality of trocar portions so as to simultaneously introduce the plurality of surgical instruments as shown in FIG. 1 into an abdominal cavity. However, in such single port surgery, the number of used instruments is limited, and a number of instruments inserted through the same position of a small incision collide with each other, and thus surgery cannot be performed while a large angle is formed. Therefore, despite a theoretical advantage in that patient's quality of life is considered by forming only one incision, this single port surgery is still not widely used due to technical limitations.

Therefore, there is a need for a method of safely and effectively performing laparoscopic surgery like a conventional multi-port method while maintaining an advantage of minimizing surgical scars.

DISCLOSURE

Technical Problem

The present invention is directed to providing a laparoscopic surgical instrument that does not require a trocar, in which, since the laparoscopic surgical instrument includes a surgical instrument inserted into an abdominal cavity and operated, and an operation unit capable of performing surgery as one device by being coupled to the surgical instrument, which is disposed inside the surgical instrument, outside a body, and is developed to have a minimized coupling portion, a trocar is not inserted into an abdominal wall, and thus laparoscopic surgery is allowed to be performed without leaving a scar due to a wound.

The objects of the present invention are not limited to those described above and other objects not described herein will be clearly understood by those skilled in the art from the following description.

Technical Solution

In order to achieve the above objects, according to an embodiment of the present invention, a laparoscopic surgery instrument that does not require a trocar includes a first part which is inserted into a body and includes a surgical instrument, and a second part disposed outside an abdominal cavity and coupled to the first part to operate an operating state of the surgical instrument, wherein, in a state in which the first part is inserted into the body, the first part and the second part are primarily coupled to each other by a magnetic force.

Advantageous Effects

According to embodiments of the present invention, without using a separate trocar for laparoscopic surgery, laparoscopic surgery can be performed using a surgical instrument inserted into an abdominal cavity and an operation unit capable of operating an operating state of the surgical instrument by being coupled to the surgical instrument outside a body.

Accordingly, there is no need to install a plurality of surgical instruments through one incision as in a conventional single port method, and in the same manner as conventional multi-port laparoscopy surgery, a degree of freedom of a surgical instrument can be secured, thereby providing all laparoscopic surgeries requiring precision.

The effects of the present invention are not limited to those described above and other effects not described herein will be clearly understood by those skilled in the art from the following description.

DESCRIPTION OF DRAWINGS

FIG. 1 is an image showing a conventional laparoscopic instrument.

FIG. 2 shows conceptual diagrams illustrating conventional single port surgery.

FIG. 3 is a conceptual diagram illustrating a laparoscopic surgical instrument that does not require a trocar according to an embodiment of the present invention.

FIG. 4 is a conceptual diagram illustrating a state in which the laparoscopic surgical instrument not requiring a trocar is coupled according to an embodiment of the present invention.

FIG. 5 is a flowchart illustrating a method of using a laparoscopic surgical instrument that does not require a trocar according to an embodiment of the present invention.

FIGS. 6 and 7 are diagrams for describing a configuration of a guide portion for a safe coupling between a first part and a second part.

BEST MODE OF THE INVENTION

Hereinafter, exemplary embodiments of the present invention will be described in detail with reference to the accompanying drawings. In this case, the same reference numbers are used throughout the drawings to refer to the same or like parts. Detailed descriptions of well-known functions and configurations which may obscure the gist of the present invention will be omitted. For the same reason, some of the elements in the accompanying drawings are exaggerated, omitted, or schematically illustrated, Throughout the specification, when a portion may "comprise" or "include" a certain constituent element, unless explicitly described to the contrary, it may not be construed to exclude another constituent element but may be construed to further include other constituent elements. Further, throughout the specification, the word "on" means positioning on or below the object portion, but does not essentially mean positioning on the lower side of the object portion based on a gravity direction.

FIG. 3 is a conceptual diagram illustrating a laparoscopic surgical instrument that does not require a trocar according to an embodiment of the present invention. FIG. 4 is a conceptual diagram illustrating a state in which the laparoscopic surgical instrument not requiring a trocar is coupled according to an embodiment of the present invention.

Referring to FIGS. 3 and 4, a laparoscopic surgical instrument 10 that does not require a trocar includes a first part 110 inserted into a body and a second part 120 disposed outside the body. The first part 110 and the second part 120 may be coupled to each other by a magnetic force in a state in which the first part 110 is inserted into the body.

The first part 110 is inserted into an abdominal cavity and includes a first body 111, a surgical instrument 112, a first magnet 113, and a needle accommodation portion 114. The first part 110 may be inserted into the body, for example, through a trocar installed for conventional single-port laparoscopy surgery.

The first body 111 serves to support the surgical instrument 112 and may be formed to extend in one direction to support the surgical instrument 112.

Although not shown in FIG. 3, the first body 111 may include a communication module, a battery, and the like. Here, when the first part 110 and the second part 120 are coupled to each other, the communication module forms a communication channel between the first part 110 and the second part 120. A signal is transmitted according to an operation by the second part 120 through the formed communication channel to operate the surgical instrument 112 of the first part 110.

The surgical instrument 112 is coupled to one end portion of the first body 111 and is operated according to the operation by the second part 120. An example in which the surgical instrument 112 is formed as forceps is shown in FIG. 3, but the present invention is not necessarily limited thereto. That is, the surgical instrument 112 may be formed as any one of an energy device, forceps, and surgical scissors, and it is an axiomatic fact that various surgical instruments usable in laparoscopic surgery can be applied. In addition, the surgical instrument 112 coupled to the first body 111 may be replaced with various types as needed.

The first magnet 113 may be provided at the other end portion of the first body 111 coupled to the second body 121. The first magnet 113 may be formed in a donut shape in consideration of the needle accommodation portion 114 formed in a central portion thereof as described below, but a shape thereof is not necessarily limited thereto. In addition, the first magnet 113 may be formed as a neodymium magnet so as not to be easily separated in a state of being coupled to a second magnet 123, but the present invention is not necessarily limited thereto. Also, the first magnet 113 may be formed as an electromagnet.

The needle accommodation portion 114 may be additionally provided at the other end portion of the first body 111 coupled to the second body 121. For example, the needle accommodation portion 114 may be formed in the central portion of the first magnet 113 to accommodate a needle 124 protruding from the second part 120. In a state in which the first part 110 and the second part 120 are primarily coupled to each other by a magnetic force with an abdominal wall interposed therebetween, when the needle 124 is insertion-coupled to the needle accommodation portion 114 as described below, a coupling between the first part 110 and the second part 120 may be more firmly maintained.

The second part 120 is disposed outside an abdominal cavity, is coupled to the first part 110 to operate an operating state of the surgical instrument 112, and includes a second body 121, an operation unit 122, the second magnet 123, and the needle 124.

The second body 121 may be formed in a shape corresponding to the first body 111 such that one end portion thereof may be coupled to the first body 111, and the other end portion of the second body 121 may be connected to the operation unit 122. The second body 121 may be formed to extend in one direction like the first body 111.

Although not shown in FIG. 3, the second body 121 may include a communication module, a battery, and the like. As described above, when the first part 110 and the second part 120 are coupled to each other, the communication module forms a communication channel between the first part 110 and the second part 120. A signal is transmitted according to an operation by the second part 120 through the formed communication channel to operate the surgical instrument 112 of the first part 110.

The operation unit 122 may serve to operate the surgical instrument 112 and may include various setting buttons or operation buttons according to the type or condition of the surgical instrument 112. An input signal may be transmitted to the surgical instrument 112 of the first part 110 through the communication channel according to an operation of the setting button or the operation button.

The second magnet 123 may be provided at one end portion of the second body 121 coupled to the first body 111. The second magnet 123 may be formed in a donut shape in consideration of the needle 124 protruding from a central portion as described below, but a shape thereof is not necessarily limited thereto. In addition, the second magnet 123 may be formed as a neodymium magnet so as not to be easily separated in a state of being coupled to the first magnet 113, but the present invention is not necessarily limited thereto. Also, the second magnet 123 may be formed as an electromagnet.

The needle 124 may be additionally provided at one end portion of the second body 121 coupled to the first body 111. For example, the needle 124 may be formed to protrude from the central portion of the second magnet 123. The needle 124 protrudes according to an operation by the operation unit 122, passes through a patient's abdominal wall W, and is insertion-coupled to the needle accommodation portion 114 formed in the first body 111 of the first part 110. As such, when the needle 124 is coupled to the needle accommodation portion 114, a coupling between the first part 110 and the second part 120 can be more firmly maintained so that the first part 110 and the second part 120 may not be easily separated.

Modes of the Invention

FIG. 5 is a flowchart illustrating a method of using a laparoscopic surgical instrument that does not require a trocar according to an embodiment of the present invention.

Referring to FIG. 5, a laparoscopic surgical instrument that does not require a trocar according to an embodiment of the present invention may be operated in the following order.

First, laparoscopic surgery is prepared (1). At least one wound may be formed in an abdominal wall for the laparoscopic surgery. The present invention is applicable to both single-port laparoscopy surgery and multi-port laparoscopy surgery.

Thereafter, a first part is inserted into a body through the formed wound (2).

Next, the first part inserted into the body is coupled to a second part (3). In this case, the first part and the second part are primarily coupled by a magnetic force, and the first part and the second part may be further guided to be more firmly coupled through a needle. The laparoscopic surgery is performed in a state in which the first part and the second part are coupled as described above.

Finally, when the surgery is completed, the first part and the second part are separated to take the first part out of the body (4). In this case, separate suturing is unnecessary for a portion of the abdominal wall to which the first part and the second part are coupled, and a scar is not left.

FIG. 6 is a diagram for describing a configuration of a guide portion for a safe coupling between a first part and a second part.

Referring to FIG. 6, any one of the first part and the second part is provided with a guide portion capable of accommodating the other part therein. In this case, only when the first part and the second part are in accurate contact with the guide portion G, the two parts are integrated by a magnetic force.

In FIG. 7, the present invention further provides a configuration in which, through a cylinder S which is provided with a surgical tool such as a needle and extends from a first part to a second part, the first part and the second part are magnetically coupled to then improve the integrity of a surgical tool in a physical manner Referring to FIG. 7, after the first part and the second part are coupled, the cylinder inside the first part extends toward the second part. As a result, through the cylinder, surgical tools such as needles also extend stably through the first part-second part to a surgical site and are more stable as compared with a case in which a coupling structure is maintained only through magnetism.

Meanwhile, the embodiments of the present invention illustrated in the present specification and drawings are present as specific examples to easily describe the technical contents of the present invention and to enhance understanding of the present invention and are not provided to limit the scope of the present invention. It will be apparent to those skilled in the art to which the present invention pertains that various modifications and variations may be made based on the technical idea of the present invention in addition to the embodiments disclosed herein.

INDUSTRIAL APPLICABILITY

The present invention relates to a surgical instrument and has industrial applicability.

The invention claimed is:

1. A laparoscopic surgery instrument that does not require a trocar, the laparoscopic surgery instrument comprising:
   a first part configured to be inserted into an abdominal cavity of a patient and including a surgical instrument; and
   a second part configured to be disposed outside the abdominal cavity of the patient and coupled to the first part to operate an operating state of the surgical instrument,
   wherein the first part and the second part are primarily coupled to each other by a magnetic force in a state in which the first part is inserted into the abdominal cavity of the patient,
   wherein the second part includes a needle configured to protrude in response to an pera ion of the operation unit,
   wherein the first part includes a needle on portion configured to receive needle protruding from the second part, and
   wherein the first part and the second are configured such that the needle protrudes and is inserted into the needle accommodation portion to form a secondary coupling while the first part and the second part are in the primarily coupled state with an abdominal wall configured to be interposed therebetween.

2. The laparoscopic surgery instrument of claim 1, wherein the first part includes:
   a first body formed to extend in one direction and configured to support the surgical instrument;
   the surgical instrument configured to be coupled to one end portion of the first body; and
   a first magnet provided at the other end portion of the first body.

3. The laparoscopic surgery instrument of claim 2, wherein the second part includes:
   a second body formed to extend in one direction and having one end portion configured to be coupled to the first body;
   an operation unit connected to the other end portion of the second body and configured to operate the surgical instrument; and
   a second magnet provided at the one end portion of the second body.

4. The laparoscopic surgery instrument of claim 3, wherein:
   the first body and the second body each further includes a communication module; and
   when the first part and the second part are configured to form a communication channel between the first part and the second part when the first part and the second part are coupled to each other, so as to transmit a signal corresponding to an operation by the second part.

5. The laparoscopic surgery instrument of claim 1, wherein the surgical instrument is formed as any one of an energy device, forceps, and surgical scissors and is configured to be replaceable.

* * * * *